(12) United States Patent
Li et al.

(10) Patent No.: US 10,152,155 B2
(45) Date of Patent: Dec. 11, 2018

(54) MUTUAL CAPACITIVE IN-CELL DISPLAY DEVICE AND THE DRIVING METHOD THEREOF

(71) Applicant: Wuhan China Star Optoelectronics Technology Co. Ltd., Wuhan, Hubei (CN)

(72) Inventors: Man Li, Guangdong (CN); Feilin Ji, Guangdong (CN); Xiaoping Tan, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 183 days.

(21) Appl. No.: 15/118,830

(22) PCT Filed: Jul. 12, 2016

(86) PCT No.: PCT/CN2016/089749
§ 371 (c)(1),
(2) Date: Aug. 12, 2016

(87) PCT Pub. No.: WO2017/181538
PCT Pub. Date: Oct. 26, 2017

(65) Prior Publication Data
US 2018/0164928 A1    Jun. 14, 2018

(30) Foreign Application Priority Data
Apr. 18, 2016 (CN) .......................... 2016 1 0239355

(51) Int. Cl.
*G06F 3/041* (2006.01)
*G06F 3/044* (2006.01)
(Continued)

(52) U.S. Cl.
CPC .......... *G06F 3/0412* (2013.01); *G02F 1/1368* (2013.01); *G02F 1/13338* (2013.01);
(Continued)

(58) Field of Classification Search
USPC .................................................. 345/170–176
See application file for complete search history.

(56) References Cited

U.S. PATENT DOCUMENTS 9,898,121 B2 * 2/2018 Shahparnia ........... G06F 3/0416
2008/0062147 A1 * 3/2008 Hotelling ............ G02F 1/13338
                                                           345/174
(Continued)

FOREIGN PATENT DOCUMENTS

CN    203133794 U    8/2013
CN    104280920 A    1/2015
(Continued)

*Primary Examiner* — Tony Davis
(74) *Attorney, Agent, or Firm* — Andrew C. Chang

(57) ABSTRACT

The present disclosure discloses a mutual capacitive in-cell display device and the driving method thereof. The mutual capacitive in-cell display device comprises: a first substrate; a touch panel, which is provided on the first substrate; a driver integrated circuit, which is used to send a first enable signal and a second enable signal; multiple gate lines, each gate line comprising a first switching transistor, the control terminal of the first switching transistor being connected to the driver integrated circuit; multiple data lines, each data line comprising a second switching transistor, the control terminal of the second switching transistor being connected to the driver integrated circuit. When the first switching transistor is turned on in responses to the first enable signal and the second switching transistor is turned on in response to the second enable signal in standby mode, the multiple data lines are connected to the touch panel to discharge.

8 Claims, 3 Drawing Sheets

(51) Int. Cl.
    *G09G 3/36*     (2006.01)
    *G02F 1/1368*     (2006.01)
    *G02F 1/1362*     (2006.01)
    *G02F 1/1333*     (2006.01)

(52) U.S. Cl.
    CPC ........ *G02F 1/136286* (2013.01); *G06F 3/044* (2013.01); *G06F 3/0416* (2013.01); *G09G 3/3677* (2013.01); *G09G 3/3688* (2013.01)

(56) References Cited

U.S. PATENT DOCUMENTS

| | | | |
|---|---|---|---|
| 2008/0309627 A1* | 12/2008 | Hotelling | G02F 1/134363 345/173 |
| 2011/0267305 A1* | 11/2011 | Shahparnia | G06F 3/0412 345/174 |
| 2015/0097817 A1* | 4/2015 | Chung | G09G 3/3696 345/206 |
| 2016/0092027 A1* | 3/2016 | Lee | G06F 3/044 345/174 |
| 2017/0031524 A1* | 2/2017 | Shin | G06F 3/0412 |
| 2017/0212626 A1* | 7/2017 | Zhao | G06F 3/0416 |

FOREIGN PATENT DOCUMENTS

| | | |
|---|---|---|
| CN | 104570417 A | 4/2015 |
| CN | 105138179 A | 12/2015 |
| CN | 105335009 A | 2/2016 |

\* cited by examiner

MUTUAL CAPACITIVE IN-CELL DISPLAY DEVICE AND THE DRIVING METHOD THEREOF

BACKGROUND OF THE INVENTION

1. Field of the Invention

The present disclosure relates to the fields of liquid crystal display, and in particular to a mutual capacitive in-cell display device and the driving method thereof.

2. The Related Arts

With the deepening degree of competition of the smart phone market, touch-display integrated products usher in a new round of competition. Embedded touch technology is to combine touch panel and liquid crystal panel and to embed touch panel features into the liquid crystal panel, so that the liquid crystal display panel have the function of displaying and sensing touch input. Existing embedded touch technology is mainly divided into two. One is on-cell, which is the structure of touch panel formed on liquid crystal cell; the other is in-cell, which is the structure of touch panel formed in the liquid crystal cell. With the rapid development of display technology, in-cell touch panel is considered to be advanced technology in the art. Wherein, mutual capacitive in-cell touch panel has the advantages of high touch precision, available for multi-touch, and etc., so it welcome access to many small and medium size screen manufacturer.

Now smart phones usually have the function of gesture wake-up in standby mode, such as double-click wake or sliding wake. Therefore, even in standby mode, the display panel also needs to continuously scan the touch panel to check whether there is gesture wake-up. In terms of a display with in-cell structure, the touch sensor always detects the touch panel in standby mode, that is, there is continuous sensing signal input. In this situation, if there are residual charges in the liquid crystal, these residual charges will produce liquid crystal polarization under the action of the sensing signals. If the monitor is in standby mode of displaying black screen for a long time, it will result in the liquid crystal maintaining in a deflection angle for a long time, leading to abnormal display.

SUMMARY OF THE INVENTION

In order to solve the above problems, the present disclosure provides a mutual capacitive in-cell display device and the driving method thereof which is simpler, more efficient and lower power consumption.

One aspect of the present disclosure provides a mutual capacitive in-cell display device, comprising: a first substrate; a touch panel, which is provided on the first substrate; a driver integrated circuit, which is used to send a first enable signal and a second enable signal; multiple gate lines, each gate line comprising a first switching transistor, the control terminal of the first switching transistor being connected to the driver integrated circuit; multiple data lines, each data line comprising a second switching transistor, the control terminal of the second switching transistor being connected to the driver integrated circuit; wherein, when the first switching transistor and the second switching transistor are turned on by respectively responding to the first enable signal and the second enable signal in standby mode, the multiple data lines are connected to the touch panel to discharge.

Alternatively, the touch panel comprises multiple mutual capacitive touch sensors arranged in matrix, each touch sensor comprises a first electrode and a second electrode, the first electrode sends touch signal, and the second electrode receives touch signal.

Alternatively, the first electrode is provided on the first substrate in row direction, the second electrode is provided on the first electrode in column direction, an insulating layer is provided between the first electrode and the second electrode.

Alternatively, the second switching transistor is connected between the data line and the first electrode of the touch sensor.

Alternatively, the second switching transistor is connected between the data line and the second electrode of the touch sensor.

Alternatively, when not performing touch scanning, the first electrode of the touch sensor has a predetermined potential, the multiple data lines are discharge to the predetermined potential during the second switching transistor turned on.

Alternatively, the predetermined potential is a ground potential.

Alternatively, the first switching transistor is connected between the gate line and a gate driver, the gate driver is used to apply a VGH signal to the multiple gate lines during the first switching transistor turned on.

Alternatively, the gate driver comprises a GOA circuit.

Alternatively, it further comprises: a liquid crystal layer, which is provided on the first substrate integrally with the touch panel; a second substrate, which is provided on the liquid crystal layer; and a transparent cover, which is provided on the second substrate; wherein, a color filter is provided on the surface of the second substrate facing the touch panel.

Another aspect of the disclosure provides a driving method of mutual capacitive in-cell display device, comprising: in standby mode, a driver integrated circuit sending a first enable signal and a second enable signal simultaneously at a predefined interval; a first switching transistor connected to a gate line being turned on in response to the first enable signal, a second switching transistor connected to a data line being turned on in response to the second enable signal; wherein, during the first transistor and the second switching transistor being turned on, the data line is connected to a touch panel to discharge.

Alternatively, the predefined interval is the scanning period of N frames, and each frame in the N frames comprises a first period performing a touch scanning and a second period performing a display scanning, wherein, N is a positive integer.

Alternatively, the touch panel comprises multiple mutual capacitive touch sensors arranged in matrix, each mutual capacitive touch sensor comprises a first electrode and a second electrode receiving touch signal, the second switching transistor is connected to the first electrode, wherein, the first electrode has a predetermined potential during the second period, the data line is discharge to the predetermined potential during the second switching transistor turned on.

Alternatively, the predetermined potential is a ground potential.

Alternatively, the gate driver applies a VGH signal to the gate line during the first switching transistor turned on.

The mutual capacitive in-cell display device and the driving method thereof according to the present disclosure can effectively solve the liquid crystal polarization risks caused by the residual charges in standby mode and reduce the driving power at the same time.

In the following, the present disclosure is described in detail in part. However, other features and/or advantages of the disclosure will become apparent from the description or may be learned through the practice of the invention

BRIEF DESCRIPTION OF THE DRAWINGS

From the following description of the embodiments of the drawings, above and/or other objects and advantages of the present disclosure will become more apparent.

DETAILED DESCRIPTION OF THE PREFERRED EMBODIMENTS

Figure 1:
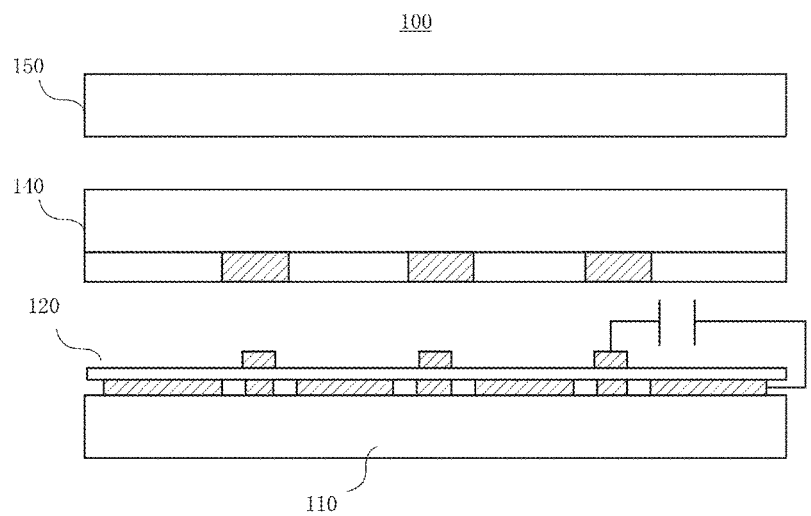
FIG. 1 is a schematic view illustrating the laminated structure of the mutual capacitive in-cell display device according to the embodiment of the present disclosure.

Hereinafter, an embodiment of the present disclosure will be described in detail in conjunction with the accompanying drawings. In the drawings, it clearly and concisely shows the main elements related to the inventive concept, the shape layers or regions thereof may be exaggerated, and the minor elements may be omitted in order to avoid unclear statements. Throughout the specification drawings, the same numeral refers to same element. However, the present disclosure is not limited to the following examples. Features, elements or structures involved in the cases or the corresponding method described in the various embodiments may be applied to other embodiments alone or in combination.

FIG. 1 is a schematic view illustrating the laminated structure of the mutual capacitive in-cell display device according to the embodiment of the present disclosure. As shown in FIG. 1, the mutual capacitive in-cell display device 100 comprises a first substrate 110 and a touch panel 120. The touch panel 120 is provided on the first substrate 110. In the present embodiment, the first substrate 110 can be a thin film transistor array substrate. The first substrate 110 comprises multiple gate lines, multiple data lines and multiple pixels located at the intersection of the gate lines and the data lines. Each pixel comprises a switching transistor, a driving transistor and a capacitor. In the present embodiment, the touch panel 120 can be provided on the surface of the first substrate 110.

In another embodiment, alternatively, the mutual capacitive in-cell display device 100 further comprises a liquid crystal layer 130 (not shown), a second substrate 140, and a transparent cover 150. The liquid crystal layer 130 and the touch panel 120 can be integrally provided on the first substrate 110 using in-cell technology. In-cell technology is a method of the touch panel embedded into the liquid crystal layer. The technology can avoid degassing and create good vacuum when bonding multiple panels of the display device, which thereby improves the bonding yield of the display device, and the display device become thinner. The second substrate 140 can be provided on the liquid crystal layer 130. The second substrate 140 can be a color filter substrate. Multiple color filters can be provided on the surface of the second substrate 140 facing the touch panel 120. The multiple color filters can be red filters, green filters and blue filters arranged in an array. The transparent cover 150 can be provided on the second substrate 140. The transparent cover 150 can be made of glass, which is used to cover the upper surface of the display device in order to protect it from the outside environment.

Figure 2:
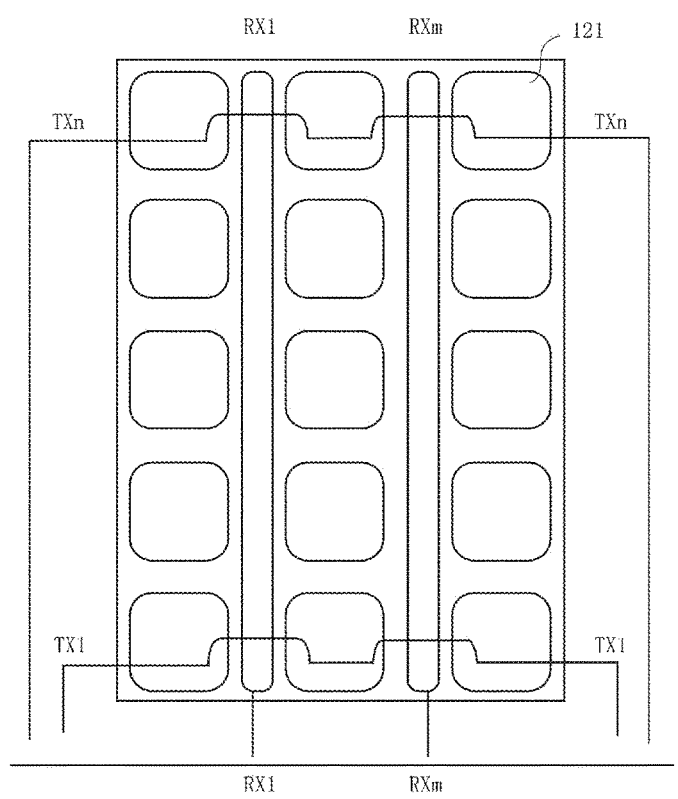
FIG. 2 is a plan view of the touch panel of the mutual capacitive in-cell display device shown in FIG. 1.

FIG. 2 is a plan view of the touch panel of the mutual capacitive in-cell display device shown in FIG. 1. In one embodiment, the touch panel 120 comprises multiple touch sensors 121. The touch sensors 121 can be arranged in matrix. The display device 100 can sense touch motion or gesture occurred on the display panel through the multiple touch sensors 121. Each touch sensor 121 comprises a first electrode TX and a second electrode RX. The first electrode TX sends touch signal, and the second electrode RX receives touch signal.

Alternatively, in one embodiment, the first electrode TX is provided on the first substrate 110 in a first direction, the second electrode RX is provided on the first electrode TX in a second direction. The first direction can be row direction, and the second direction can be column direction. The first direction can be substantially perpendicular to the second direction. An insulating layer is provided between the first electrode TX and the second electrode RX.

Referring to FIG. 2, in the present embodiment, the first electrode TX can sends a common voltage VCOM. The first electrode TX1 to TXn are provided on the first substrate 110 in row direction. The first electrodes TX of each row are spaced out a predetermined distance apart. The first electrodes TX of each column are spaced out a predetermined distance apart. For each touch sensor 121, the second electrode RX can be provided on the first electrode TX with the insulating layer interposed therebetween. The second electrode RX may be made of a conductive material, such as metal. The first electrode TX and the second electrode RX together constitute a mutual capacitive touch structure.

In standby mode, the display device 100 needs to constantly scan the touch panel 120 to detect whether there has been a touch input or a wake-up gesture. When there are residual charges in the liquid crystal, these residual charges will produce liquid crystal polarization under the action of the scanning signals. The mutual capacitive in-cell display device according to the present disclosure can solve the above problems. Next, FIGS. 3 and 4 will be described in detail.

Figure 3:
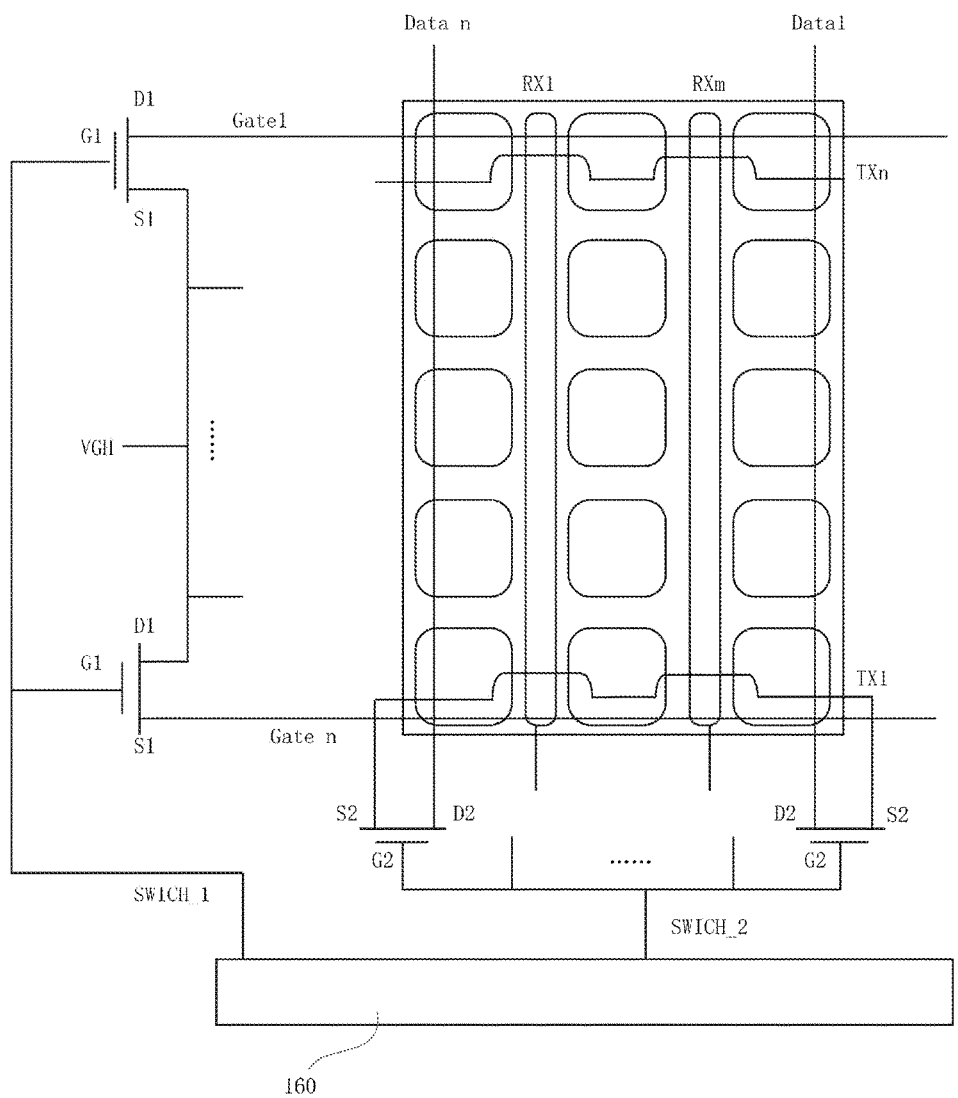
FIG. 3 is a plan view of the touch panel of the mutual capacitive in-cell display device according to the embodiment of the present disclosure.

FIG. 3 is a plan view of the touch panel of the mutual capacitive in-cell display device according to the embodiment of the present disclosure. As shown in FIG. 3, the display device 100 comprises a driver integrated circuit 160. The driver integrated circuit 160 is used to send a first enable signal SWICH_1 and a second enable signal SWICH_2. Multiple gate lines G1 to Gn and multiple data lines D1 to Dn are located on the first substrate 110. Wherein, each gate line comprises a first switching transistor TFT1, and each data line comprises a second switching transistor TFT2.

Referring to FIG. 3, in one embodiment, the driver integrated circuit 160 can be provided below the touch panel 120. The first switching transistor TFT1 connected to the multiple gate lines G1 to Gn can be provided on the left side of the touch panel 120 in row direction. The second switching transistor TFT2 connected to the multiple data lines D1 to Dn can be provided between the touch panel 120 and the driver integrated circuit 160 in column direction. In the present embodiment, the first switching transistor TFT1 and the second switching transistor TFT2 can be both N-type metal oxide semiconductor (NMOS) transistors, but the present disclosure is not limited. The first switching transistor and the second switching transistor can also be other types of transistors.

The control terminal G1 of the first switching transistor TFT1 is connected to the driver integrated circuit 160, and the control terminal G2 of the second switching transistor TFT2 is connected to the driver integrated circuit 160. Therefore, the first switching transistor TFT1 can be turned on by responding to the first enable signal SWICH_1 sent from the driver integrated circuit 160, the second switching transistor TFT2 can be turned on by responding to the second enable signal SWICH_2 sent from the driver integrated circuit 160. In the present embodiment, the first enable signal SWICH_1 and the second enable signal SWICH_2 can be high level respectively output from the driver integrated circuit 160. The first switching transistor TFT1 and the second switching transistor TFT2 can be turned on by responding to the high level, but the present disclosure is not limited.

In the other embodiment, the display device 100 further comprises a gate driver (not shown). The gate driver comprises a gate driver on array, that is, the gate driver can be GOA circuit. The GOA circuit is a technology that the gate driver of the thin film transistor TFT is directly formed on the array substrate instead of using external silicon chip to manufacture driver. Because the GOA circuit can be directly provided around the display panel, it simplifies the process technology, reduces the manufacturing cost, and improves the integration of the display device, so that the display device is thinner and lighter.

Referring to FIG. 3, the first switching transistor TFT1 can be connected between each gate line in the multiple gate lines G1 to Gn and the gate driver. The gate driver is used to apply a VGH signal to the multiple gate lines during the first switching transistor TFT1 turned on.

Specifically, the source terminal S1 of each first switching transistor TFT1 is connected to the gate driver, the drain terminal D1 thereof is connected to the corresponding gate line, and the control terminal G1 thereof is connected to the driver integrated circuit 160. When the control terminal G1 of the first switching transistor TFT1 is turned on by responding to the first enable signal SWICH_1 sent from the driver integrated circuit 160, the gate driver can apply the VGH signal to the gate lines connected to the first switching transistor TFT1 through the source terminal S1. Here, the gate driver can output a VGA signal and a VGL signal in accordance with a predetermined timing. Wherein, the VGA signal is a signal to turn on the TFT in the pixel to charge the capacitor of the pixel, the VGL signal is a signal to turn off the TFT in the pixel to maintain the voltage of the capacitor for a predetermined time.

Referring to FIG. 3, the second switching transistor TFT2 can be connected between each data line in the multiple data lines D1 to Dn and the first electrode TX of the touch sensor 121. In the present embodiment, the source terminal S2 of each second switching transistor TFT2 is connected to the first electrode TX of the touch sensor 121, the drain terminal D2 thereof is connected to the corresponding data line, and the control terminal G2 thereof is connected to the driver integrated circuit 160.

According to the inventive concept, in the standby mode of the display device 100, when the first switching transistor TFT1 and the second switching transistor TFT2 are turned on by respectively responding to the first enable signal SWICH_1 and the second enable signal SWICH_2, the multiple data lines D1 to Dn are connected to the touch panel 120 to discharge. Specifically, when not performing touch scanning operation for the touch panel 120, the first electrode TX of the touch sensor 121 can have a predetermined electric potential, such as ground potential. In this situation, when the second switching transistor TFT2 is turned on by responding to the second enable signal SWICH_2, the multiple data lines D1 to Dn are discharged to the ground potential (GND).

According to present embodiment, it timely, simply and effectively removes the residual charge in the liquid crystal display (LCD) panel of the mutual capacitive in-cell display device, which avoids the residual charge leading to liquid crystal polarization under the influence of the continuous scanning electric field in standby mode, thus ensuring good display quality and touch sensitivity.

The embodiment of the present disclosure is not limited to the above described structure. For example, the second switching transistor can not be connected between the multiple data lines and the first electrode of the bottom line of the touch sensor in the touch panel as shown in FIG. 3. On the contrary, the second switching transistor can be connected between the multiple data lines and the first electrode of any touch sensor. Moreover, the second switching transistor can be connected between the multiple data lines and the second electrode of the touch sensor in the touch panel.

Hereinafter, the driving method of mutual capacitive in-cell display device according to the embodiment of the present disclosure will be described in detail referring to FIG. 4. The above mentioned characteristics are included in the following description, which will not repeat for all non-essential characteristics.

Figure 4:
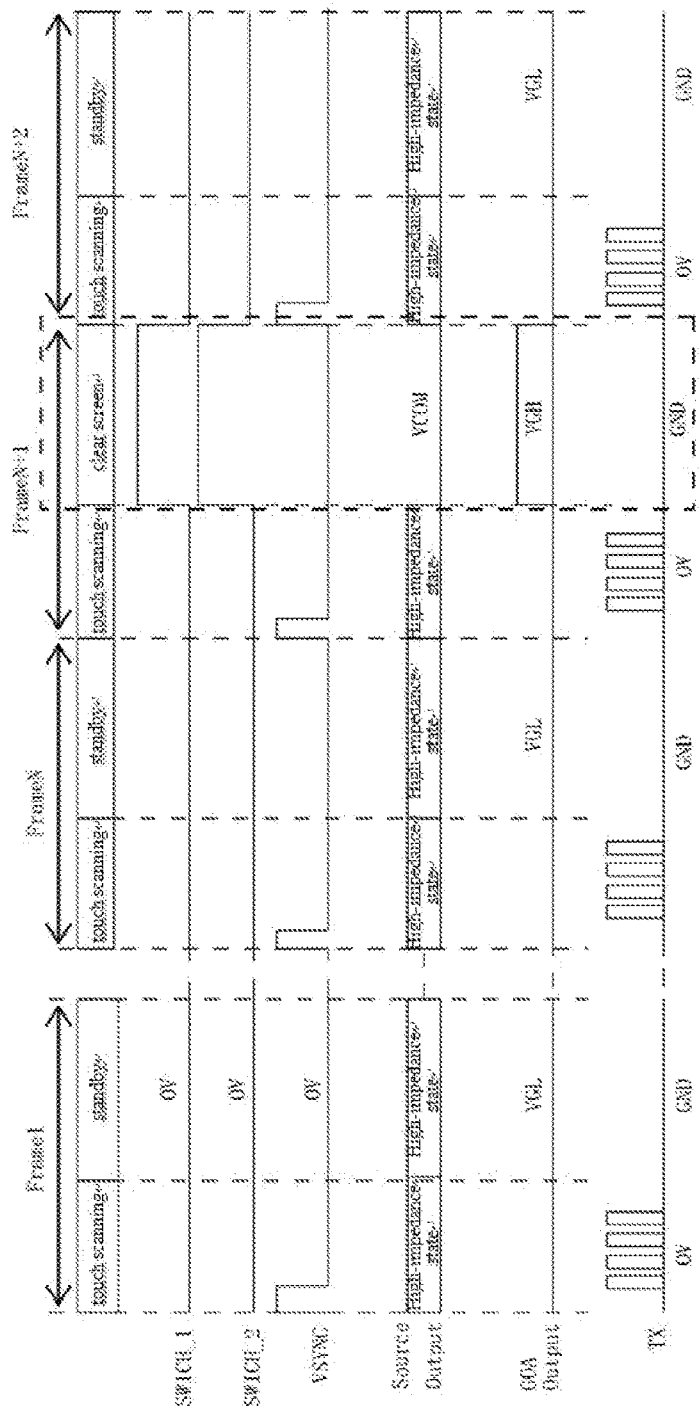
FIG. 4 is a timing diagram of the driving method of the mutual capacitive in-cell display device according to the embodiment of the present disclosure.

FIG. 4 is a timing diagram of the driving method of the mutual capacitive in-cell display device according to the embodiment of the present disclosure. Referring to FIGS. 3 and 4, when the display device 100 is in standby mode, it continuously scans the touch panel 120. Wherein, each frame can comprise two periods. A first period performs a touch scanning and a second period performs a display scanning. When it doesn't detect touch action or wake up gesture for N frames (N is a positive integer), the first enable signal SWICH_1 and the second enable signal SWICH_2 are low level during the period of the first frame to the N-th frame. Accordingly, the gate driver does not respond, and the gate line receives the VGL signal.

Next, when scanning the (N+1)-th frame, the driver integrated circuit 160 raises the level of the first enable signal SWICH_1 and the second enable signal SWICH_2 after the first period of the (N+1)-th frame is completed (that is, after the touch scanning is completed) and before the second period thereof begins. At this time, the first switching transistor of the display device 100 is turned on by responding to the first enable signal SWICH_1. Accordingly, the gate driver applies the VGA signal to the gate line. Meanwhile, the second switching transistor is turned on by responding to the second enable signal SWICH_2, so that all data lines are connected to the first electrode TX of the touch sensor 121 in the touch panel 120. Since the first electrode TX of the touch sensor 121 has a predetermined potential VCOM during the second period of not performing the touch scanning, all data lines are discharged to the predetermined potential VCOM during the second switching transistor turned on. When the predetermined potential VCOM is the ground potential GND, all data lines are discharged to ground, the residual charges in the liquid crystal panel are released via the data lines.

The driving method according to the embodiment of the present disclosure can effectively remove the residual charges in the liquid crystal panel of the mutual capacitive in-cell display device, which avoids the residual charges leading to liquid crystal polarization and thus abnormal display under the influence of the continuous scanning electric field in the standby mode of LCD.

In addition, in the mutual capacitive in-cell display device according to the embodiment of the present disclosure, the driver integrated circuit only needs to output two enable signals to turn on all data lines when the screen is cleared, so that the data lines are connected to the touch panel to discharge rapidly. Therefore, it can reduce power consumption.

The above embodiments have been shown and described, but those skilled in the art should appreciate the inventive concept of the present disclosure is not limited to these embodiments. The above embodiments can be modified and changed variously without departing from the spirit and principles of the present disclosure.

What is claimed is:

1. A mutual capacitive in-cell display device, comprising:
   a first substrate;
   a touch panel, which is provided on the first substrate;
   a driver integrated circuit, which is used to send a first enable signal and a second enable signal;
   multiple gate lines, each gate line comprising a first switching transistor, the control terminal of the first switching transistor being connected to the driver integrated circuit;
   multiple data lines, each data line comprising a second switching transistor, the control terminal of the second switching transistor being connected to the driver integrated circuit;
   wherein when the first switching transistor and the second switching transistor are turned on by respectively responding to the first enable signal and the second enable signal in standby mode, the multiple data lines are connected to the touch panel to discharge;
   wherein the touch panel comprises multiple mutual capacitive touch sensors arranged in a matrix; each touch sensor comprises a first electrode and a second electrode; the first electrode sends a touch signal; and the second electrode receives the touch signal;
   wherein the first electrode is provided on the first substrate in a row direction; the second electrode is provided on the first electrode in a column direction; an insulating layer is provided between the first electrode and the second electrode;
   wherein the second switching transistor is connected between the data line and the first electrode of the touch sensor; and
   wherein when not performing touch scanning, the first electrode of the touch sensor has a predetermined potential, the multiple data lines are discharge to the predetermined potential during the second switching transistor turned on.

2. The mutual capacitive in-cell display device as claimed in claim 1, wherein the predetermined potential is a ground potential.

3. The mutual capacitive in-cell display device as claimed in claim 1, wherein the first switching transistor is connected between the gate line and a gate driver, the gate driver is used to apply a VGH signal to the multiple gate lines during the first switching transistor turned on.

4. The mutual capacitive in-cell display device as claimed in claim 3, wherein the gate driver comprises a GOA circuit.

5. The mutual capacitive in-cell display device as claimed in claim 1, further comprising:
   a liquid crystal layer, which is provided on the first substrate integrally with the touch panel;
   a second substrate, which is provided on the liquid crystal layer; and
   a transparent cover, which is provided on the second substrate;
   wherein a color filter is provided on the surface of the second substrate facing the touch panel.

6. A driving method of a mutual capacitive in-cell display device, comprising:
   in a standby mode, a driver integrated circuit sending a first enable signal and a second enable signal simultaneously at a predefined interval;
   a first switching transistor connected to each of multiple gate lines being turned on in response to the first enable signal, a second switching transistor connected to each of multiple data lines being turned on in response to the second enable signal;
   wherein, during the first transistor and the second switching transistor being turned on, the data line is connected to a touch panel to discharge;
   wherein the touch panel comprises multiple mutual capacitive touch sensors arranged in a matrix; each touch sensor comprises a first electrode and a second electrode; the first electrode sends a touch signal; and the second electrode receives the touch signal;
   wherein the first electrode is provided on the first substrate in a row direction; the second electrode is provided on the first electrode in a column direction; an insulating layer is provided between the first electrode and the second electrode;
   wherein the second switching transistor is connected between the data line and the first electrode of the touch sensor; and
   wherein when not performing touch scanning, the first electrode of the touch sensor has a predetermined potential, the multiple data lines are discharge to the predetermined potential during the second switching transistor turned on.

7. The driving method as claimed in claim 6, wherein the predefined interval is the scanning period of N frames, and each frame in the N frames comprises a first period performing a touch scanning and a second period performing a display scanning, wherein, N is a positive integer.

8. The driving method as claimed in claim 6, wherein the gate driver applies a VGH signal to the gate line during the first switching transistor turned on.

* * * * *